United States Patent [19]

Yoshida

[11] Patent Number: 4,992,859
[45] Date of Patent: Feb. 12, 1991

[54] AUTOMATIC FOCUS CONTROL APPARATUS USING PRIMARY COLOR SIGNALS

[75] Inventor: Masanobu Yoshida, Kanagawa, Japan

[73] Assignee: Sony Corporation, Tokyo, Japan

[21] Appl. No.: 329,646

[22] Filed: Mar. 28, 1989

[30] Foreign Application Priority Data

Mar. 29, 1988 [JP] Japan ................. 63-077545

[51] Int. Cl.⁵ ......................................... H04N 5/232
[52] U.S. Cl. ....................................... 358/55; 358/227; 354/402
[58] Field of Search .............. 354/400, 402, 403, 430; 358/227, 55

[56] References Cited

U.S. PATENT DOCUMENTS

| | | | |
|---|---|---|---|
| 4,244,653 | 1/1981 | Asai et al. | 354/430 X |
| 4,550,995 | 11/1985 | Toyama | 354/403 |
| 4,591,919 | 5/1986 | Kaneda et al. | 354/402 X |
| 4,771,307 | 9/1988 | Kuno et al. | 358/227 X |
| 4,782,396 | 11/1988 | Park | 358/227 |
| 4,841,370 | 6/1989 | Murashima et al. | 354/402 X |
| 4,903,135 | 2/1990 | Ohtake et al. | 354/402 X |
| 4,945,377 | 7/1990 | Miida et al. | 354/402 |

FOREIGN PATENT DOCUMENTS

| | | |
|---|---|---|
| 0260990 | 3/1988 | European Pat. Off. |
| 335656 | 10/1989 | European Pat. Off. |
| 3443558 | 6/1985 | Fed. Rep. of Germany |
| 61-288685 | 12/1986 | Japan |
| 63-82082 | 4/1988 | Japan |

*Primary Examiner*—James J. Groody
*Assistant Examiner*—Mark R. Powell
*Attorney, Agent, or Firm*—Philip M. Shaw, Jr.

[57] ABSTRACT

An automatic focus control apparatus that makes effective use of the chromatic aberration of a lens to detect focus position information on the basis of amplitude values of color signals, whereby the apparatus can be simplified in arrangement and which can prevent the image quality from being deteriorated.

9 Claims, 4 Drawing Sheets

|  | A | B | P | C | D |
|---|---|---|---|---|---|
| $S_B'$ | I | I | II | III | III |
| $S_G'$ | II | I | I | I | II |
| $S_R'$ | III | III | II | I | I |

AUTOMATIC FOCUS CONTROL APPARATUS USING PRIMARY COLOR SIGNALS

BACKGROUND OF THE INVENTION

1. Field of the Invention

The present invention relates generally to an apparatus for detecting a focus position and, more particularly, to an automatic focus control apparatus that is for use with, for example, an auto-focus apparatus for a television camera and the like.

2. Description of the Prior Art

Auto-focus apparatus that detect a properly-focused position of a lens by detecting the contrast of a picked-up image are known (see Japanese Patent Application No. 62-146628). Varying the position of the lens while an object is picked up by the lens, it is to be noted that the picked-up image provides a best contrast at the position in which the object is kept in focus. For simplicity, this focus position will hereinafter be referred to as a properly-focused position.

Accordingly, as shown in FIG. 1, a properly-focused position P of an object can be detected by detecting the position of the lens at which an output signal from an image pickup element provides a maximal amplitude value.

According to a television camera based on the above-mentioned principle for measuring the amplitude value, the lens is moved away from its position closest to the object to sequentially detect the amplitude values of the output signals, whereby the television camera can capture the properly-focused position P by detecting the position at which the switchover from the increase to the decrease takes place in the change of the amplitude value. Therefore, by adjusting the position of the lens on the basis of the detected result, it is possible to properly focus the predetermined object.

Further, in the television camera, once the properly-focused state is established, the position of the lens is vibrated back and forth around the properly-focused position P by a predetermined width $P_W$ (hereinafter, this vibrating movement is referred to as "wobble") so that any change of the properly-focused position P can be detected regardless of the change of the properly-focused position P due to the movement of the object. Thus, the position of the lens is adjusted on the basis of the detected result, thus making it possible to provide the properly-focused state following movement of the object.

This kind of auto-focus apparatus, however, has a defect in that the quality of a picked-up image is inevitably deteriorated. Because the position of the lens is wobbled around the properly-focused position P by the predetermined width $P_W$, the picked-up image is also wobbled unnaturally, resulting in the quality of the picked-up image being deteriorated.

As one of the methods for solving the above problem, a method for wobbling the image pickup element instead of the position of the lens is known. According to this previously-proposed method, although the picked-up image can be prevented from being unnaturally wobbled and the properly-focused condition can be brought about, it needs a driving mechanism such as an actuator or the like that permits the image pickup element to wobble, in which case the overall arrangement of the auto-focus apparatus becomes complicated.

Moreover, since the image pickup element is wobbled as described above, the picked-up image is caused to be out of focus repeatedly at a predetermined period, thus the image quality thereof is deteriorated. Accordingly, the image pickup element has to be wobbled at such a low frequency as to prevent the deteriorated quality of picked-up image from becoming conspicuous to a viewer. When the moving speed of the object is too high, it becomes difficult to provide a properly-focused condition.

OBJECTS AND SUMMARY OF THE INVENTION

Accordingly, it is an object of the present invention to provide an improved automatic focus control apparatus that can eliminate the above-noted defects inherent in the prior art.

Another object of the present invention is to provide an automatic focus control apparatus which can be simplified in arrangement.

A further object of the present invention is to provide an automatic focus control apparatus which can prevent the image quality from being deteriorated.

Still another object of the present invention is to provide an automatic focus control apparatus which is suitable for a television camera.

In accordance with an aspect of the present invention, there is provided an automatic focus control apparatus comprising:

a) lens means having chromatic aberration;

b) means for converting an optical signal obtained through said lens means to an electrical signal;

c) means for processing said electrical signal to obtain a plurality of primary color signals;

d) means for detecting the level of each of said primary color signals;

e) means for generating a control signal according to levels of said primary color signals derived from said level detecting means; and f) means for controlling the position of said lens in response to said control signal.

The above, and other objects, features and advantages of the present invention will become apparent from the following detailed description of an illustrative embodiment which is to be read in conjunction with the accompanying drawings, wherein the same reference numerals and letters are used to designate corresponding elements and parts in the several views.

DETAILED DESCRIPTION OF THE PREFERRED EMBODIMENT

An embodiment of the present invention will be described with reference to the drawings.

Figure 2:
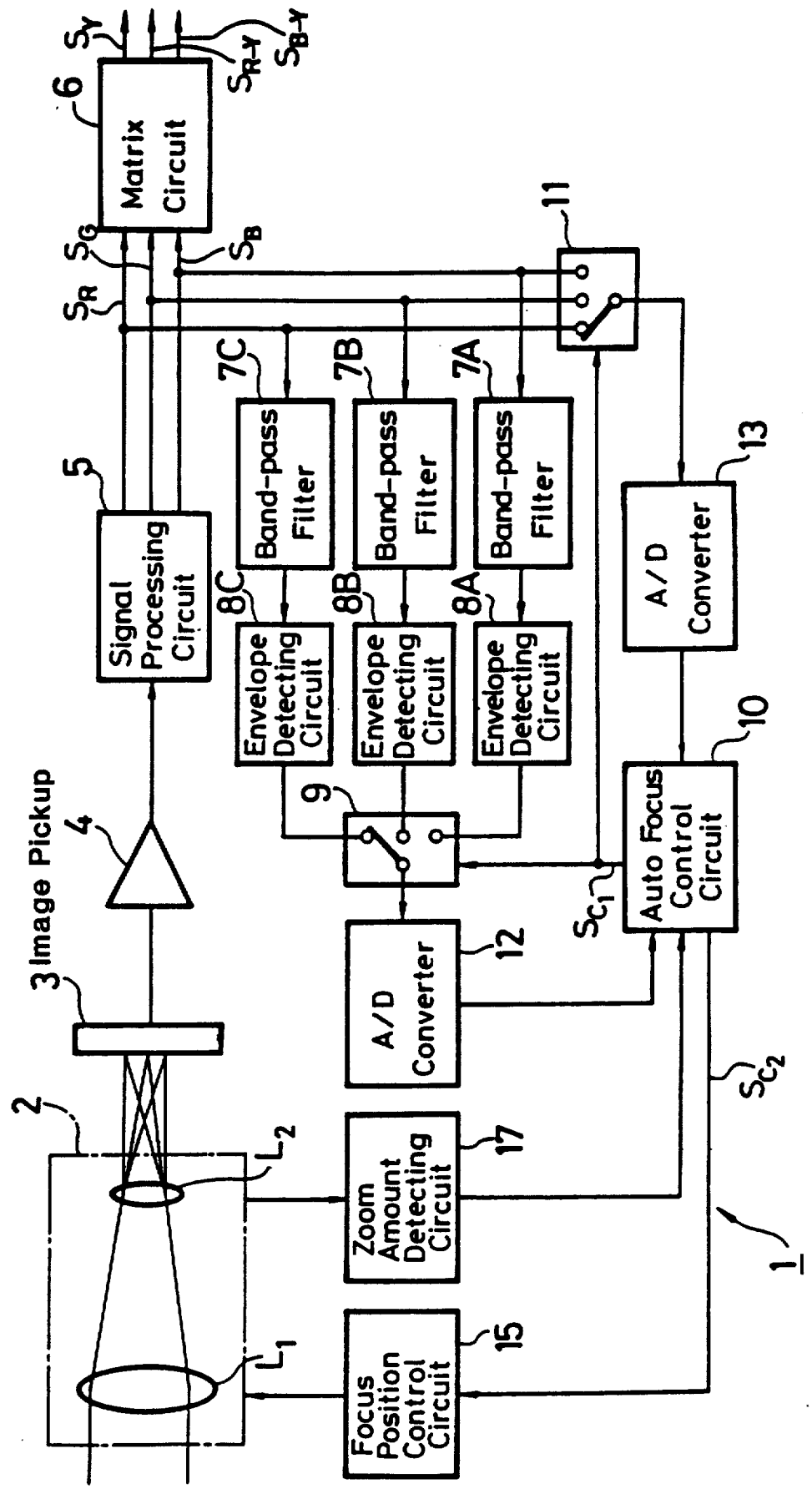
FIG. 2 is a schematic in block diagram form of an auto-focus apparatus embodying the present invention.

FIG. 2 shows an example of an auto-focus apparatus for use with a television camera.

As FIG. 2 shows, a zoom lens 2, in which $L_1$ and $L_2$ collectively designate some lens groups thereof, picks up an image of an object (not shown). The zoom lens 2 is arranged to have a predetermined, very small amount of a chromatic aberration so that it will not deteriorate the quality of the picked-up image.

Figure 1:
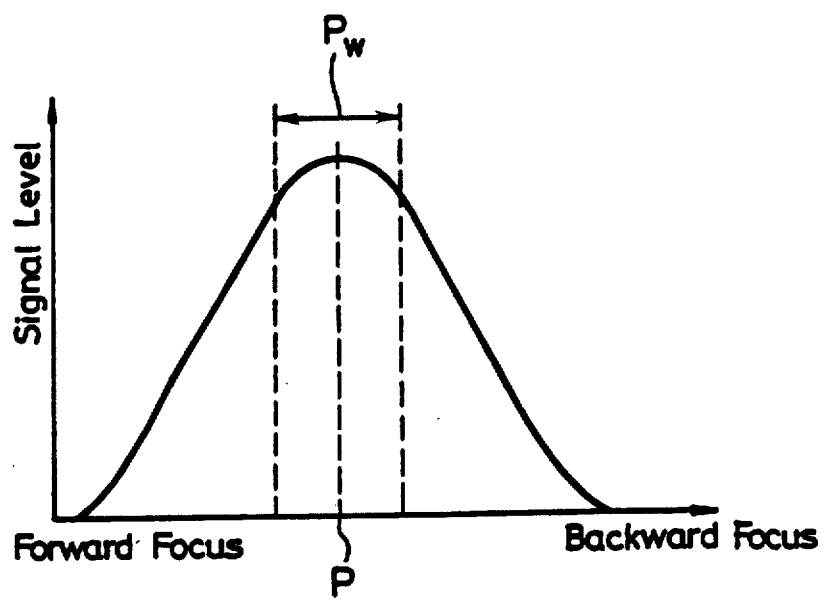
FIG. 1 is a graph used to explain a prior art auto-focus apparatus.
Figure 3:
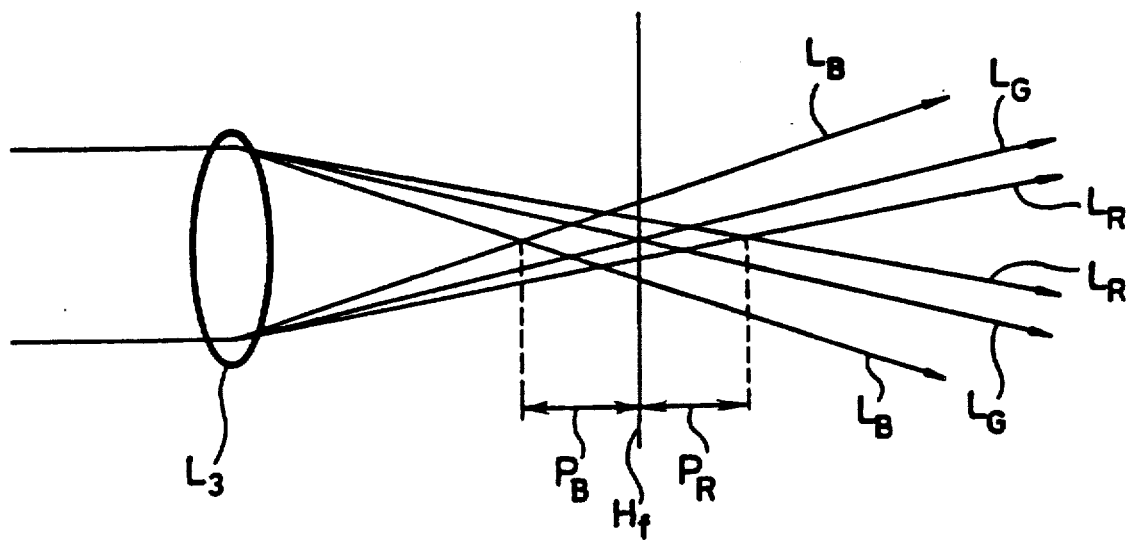
FIG. 3 is a diagram used to explain the operation of the apparatus shown in FIG. 2.

As shown in FIG. 3, when a green light $L_G$ is focused on a target screen $H_f$ of an image pickup element 3 (see FIG. 2), a blue light $L_B$ is focused at the position that is moved toward the zoom lens 2 (or lens $L_3$) side from the target screen $H_f$ by a predetermined very short length $P_B$ (this position will hereinafter be referred to as a forward focus side), while a red light $L_R$ is focused at the position that is moved in the opposite direction, i.e., toward the image pickup element 3 side, from the target screen $H_f$ by a predetermined very short length $P_R$ (this position will hereinafter be referred to as a backward focus side), respectively. In this case, the length $P_B$ is selected to be equal to the length $P_R$.

Figures 4, 5:
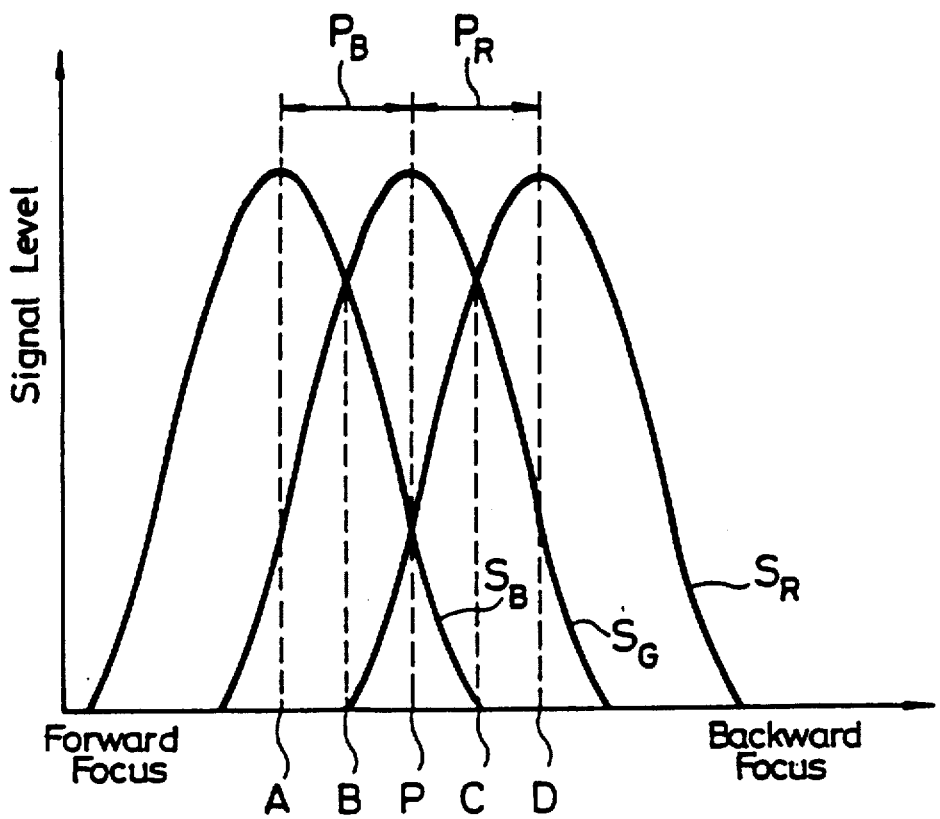
FIG. 4 is a graph used to explain the apparatus shown in FIG. 2.
FIG. 5 is a table used to explain the operation of the apparatus shown in FIG. 2.

With the above-noted arrangement, as shown in FIG. 4, when amplitude values of blue, green and red signals $S_B$, $S_G$ and $S_R$ from the image pickup element 3 are detected by varying the focus position of zoom lens 2 to the forward and backward focus sides, the green signal $S_G$ results in the maximal signal level at the properly-focused position P of the green light $L_G$, while the blue and red signals $S_B$ and $S_R$ demonstrate the maximal signal levels at the forward and backward sides with respect to the properly-focused position P as represented by A and D in FIG. 4, respectively.

The properly-focused condition can therefore be achieved by adjusting the position of the zoom lens 2 in such a manner that the amplitude value of the green signal $S_G$ may become larger than those of the blue and red signals $S_B$ and $S_R$.

To be more concrete, referring back to FIG. 2, in the auto-focus apparatus 1, the output signal from the image pickup element 3 is supplied through a pre-amplifying circuit 4 to a signal processing circuit 5, in which it is processed to be blue, green and red signals $S_B$, $S_G$ and $S_R$ These blue, green and red signals $S_B$, $S_G$ and $S_R$ are supplied to a matrix circuit 6, in which they are processed to be a luminance signal Y and two color difference signals $S_{R-Y}$ and $S_{B-Y}$.

Band-pass filter circuits 7A, 7B and 7C, each of which has a frequency range of from 500 kHz to 2 MHz, receive the blue, green and red signals $S_B$, $S_G$ and $S_R$ and extract alternate current components from these signals $S_B$, $S_G$ and $S_R$.

Detecting circuits 8A, 8B and 8C, connected to the band-pass filter circuits 7A, 7B and 7C, respectively envelope-detect the output signals from the band-pass filter circuits 7A, 7B and 7C, respectively. The amplitude value signals of the blue, green and red signals $S_B$, $S_G$ and $S_R$ output therefrom are supplied to a selector switch 9. The output of the selector switch 9 is supplied to the auto-focus control circuit 10 through an A/D converter 12.

The blue, green and red signals $S_B$, $S_G$ and $S_R$ are also supplied to a selector switch 11 whose output is converted by an A/D converter 13 to a digital signal which is supplied to the auto-focus control circuit 10.

The auto-focus control circuit 10, comprised of a computing processing circuit, i.e., a microprocessor, supplies a switching signal $S_{C1}$ to the selecting circuits 9 and 11. Thus, the auto-focus control circuit 10 is sequentially supplied with the output signals of the detecting circuits 8A, 8B and 8C through the selecting circuit 9 and the analog-to-digital (A/D) converting circuit 12 and also with the color signals $S_B$, $S_G$ and $S_R$ through the selecting circuit 11 and the analog-to-digital (A/D) converting circuit 13.

Accordingly, in the auto-focus control circuit 10, the amplitude values of the color signals $S_B$, $S_G$ and $S_R$ through the A/D converting circuit 12 can be detected, while the signal levels of the color signals $S_B$, $S_G$ and $S_R$ through the A/D converting circuit 13 can be detected.

The image pickup element 3, the pre-amplifying circuit 4, the signal processing circuit 5 and the matrix circuit 6 constitute image pickup means that picks up an image of an object by means of the zoom lens 2. On the other hand, the band-pass filter circuits 7A, 7B and 7C, the detecting circuits 8A, 8B and 8C, the selecting circuit 9 and the A/D converting circuit 12 constitute amplitude value detecting means that detects the amplitude values of the color signals $S_B$, $S_G$ and $S_R$ derived from the above image pickup means.

Further, the auto-focus control circuit 10 includes a table of values stored in internal memory (ROM) (not shown). In accordance with this table, the amplitude values of the color signals $S_B$, $S_G$ and $S_R$ are divided by the signal levels of the corresponding color signals $S_B$, $S_G$ and $S_R$ whereby the amplitude values are normalized by the signal levels.

In practice, the amplitude values of the color signals $S_B$, $S_G$ and $S_R$ are changed not only with the position of the zoom lens 2 but also with the hue of the object.

In this embodiment, since the amplitude values of the color signals $S_B$, $S_G$ and $S_R$ are normalized by means of the signal levels of the color signals $S_B$, $S_G$ and $S_R$, an object having a different hue can be properly focused positively when picked up.

Also, the auto-focus control circuit 10 is operative to compare the normalized amplitude values with respect to the respective color signals $S_B$, $S_G$ and $S_R$ and feeds a control signal $S_{C2}$ to a focus position control circuit 15 on the basis of the compared result thereof, thereby controlling the position of the zoom lens 2.

FIG. 5 is a table representing the output characteristics in which the normalized amplitude values $S_B'$, $S_G'$ and $S_R'$ of respective color signals $S_B$, $S_G$ and $S_R$ are illustrated in sequential relative level orders that decrease as they read as I, II and III. The table of FIG. 5 is stored in the internal (ROM) memory in the auto-focus control circuit 10.

As can be seen in FIG. 5, assuming that the zoom lens 2 is set at the properly-focused position P of the green light $L_G$, then the green signal $S_G'$ provides the maximal amplitude values as represented by I and the blue and red signals $S_B'$ and $S_R'$ provide amplitude values that are smaller than I but are equal to each other as represented by II.

If on the other hand the zoom lens 2 is set at the position B that is ahead of the properly-focused position P, the amplitude values of the green and red signals $S_G'$ and $S_R'$ are caused to decrease as represented by I and III while the amplitude value of the blue signal $S_B'$ is caused to increase as represented by I in FIG. 5. If the position of the zoom lens 2 is further advanced to the position A away from the properly-focused position P, the amplitude value of the color signal $S_B'$ is at a maximum and the amplitude values of the respective color signals $S_G'$ and $S_R'$ tend to decrease as represented by I, II and II, respectively.

Conversely, if the zoom lens 2 is set at the position C that is behind the properly-focused position P, the amplitude values of the green and blue signals $S_G'$ and $S_B'$ are caused to decrease as represented by I and III and the amplitude value of the red signal $S_R'$ is caused to increase as represented by I in FIG. 5. If the position of the zoom lens 2 is further moved away from the properly-focused position P to the position D, the amplitude values of the color signals $S_B'$, $S_G'$ tend to decrease and $S_R'$ becomes a maximum as represented by III, II and I in FIG. 5.

Consequently, the green signal $S_G'$ provides the maximal amplitude value in a range from the position B to the position C with respect to the properly-focused position P. If the position of the zoom lens 2 is moved to the positions B and C that are ahead of and behind the properly-focused position P, the blue and red signals $S_B'$ and $S_R'$ provide the maximal amplitude values, respectively.

Thus, it is possible for the auto-focus control circuit 10 to determine by the compared result of the normalized amplitude values $S_B'$, $S_G'$ and $S_R'$ of the respective color signals $S_B$, $S_G$ and $S_R$ whether or not the focus position of the light $L_B$ is moved toward the zoom lens 2 side, whether or not the focus position of the light $L_R$ is moved toward the image pickup element 3 side or whether or not the light $L_G$ is properly focused at the position P. It is also possible to detect the amount of how much the position of the zoom lens 2 is displaced from the properly-focused position P of the green light $L_G$.

Further, in this auto-focus control circuit 10, the focal length of the zoom lens 2 is detected by a zoom amount detecting circuit 17. The thus detected focal length is used to compensate the above-mentioned detected results.

Practically, in the zoom lens 2, the lengths $P_B$ and $P_R$ from the properly-focused position P of the green light $L_G$ to the properly-focused positions A and D of the blue light $L_B$ and the red light $L_R$ are changed with the focal length of the zoom lens 2.

Accordingly, the properly-focused position P can be positively detected or the displaced amount of the green light $L_G$ from the properly-focused position P can be detected by compensating for the displaced amount from the properly-focused position P on the basis of the focal length of the zoom lens 2.

Therefore, by adjusting the position of the zoom lens 2 such that the displaced amount from the properly-focused position P falls below the predetermined value, it is possible to get the object in proper focus regardless of high speed movement of the object.

According to this embodiment of the present invention, since the position of the zoom lens 2 and the image pickup element 3 need not be wobbled, the overall arrangement of the apparatus can be simplified and the quality of the picked-up image can be prevented from being deteriorated.

Further, since the displaced amount from the properly-focused position P can be detected without wobbling the position of the zoom lens 2 and the image pickup element 3, regardless of the high moving speed of the object, the object can be properly focused following the high speed movement of the object.

Thus, the auto-focus control circuit 10 constitutes a focus position information detecting means that detects focus position information to pick up the object by means of the zoom lens 2 and by comparing the detected results of the normalized amplitude values of the respective color signals $S_B$, $S_G$ and $S_R$ derived by dividing the amplitude values by the corresponding signal levels of the blue, green and red signals $S_B$, $S_G$ and $S_R$.

With the above-mentioned arrangement, an image of an object is focused on the target screen $H_f$ of the image pickup element 3 through the zoom lens 2 having the predetermined, very small amount of chromatic aberration and the amplitude values of the color signals $S_B$, $S_G$ and $S_R$ thereof are detected via the band-pass filter circuits 7A, 7B and 7C and the detecting circuits 8A, 8B and 8C.

Together with the color signals $S_B$, $S_G$ and $S_R$ the amplitude values are supplied through the selecting circuits 9, 11 and the A/D converting circuits 12, 13 to the auto-focus control circuit 10 that normalizes them by the signal levels of the color signals $S_B$, $S_G$ and $S_R$ thereby producing the compared results. The compared results are compensated on the basis of the focal length of the zoom lens 2, and the position of the zoom lens 2 is adjusted on the basis of the thus compensated result.

With the above-mentioned arrangement, since the object is picked up by using the zoom lens 2 having the predetermined, very small amount of the chromatic aberration and the focus position information is detected on the amplitude values of the resultant color signals $S_B$, $S_G$ and $S_R$, the displaced amount from the properly-focused position P can be detected without wobbling the position of the zoom lens 2 and the image pickup element 3, thus making it possible to obtain an automatic focus control apparatus of simplified arrangement which can prevent the image quality from being deteriorated.

The operation of the auto-focus control circuit 10 in FIG. 2 will now be described in accordance with a flow chart shown in FIG. 6.

Figure 6:
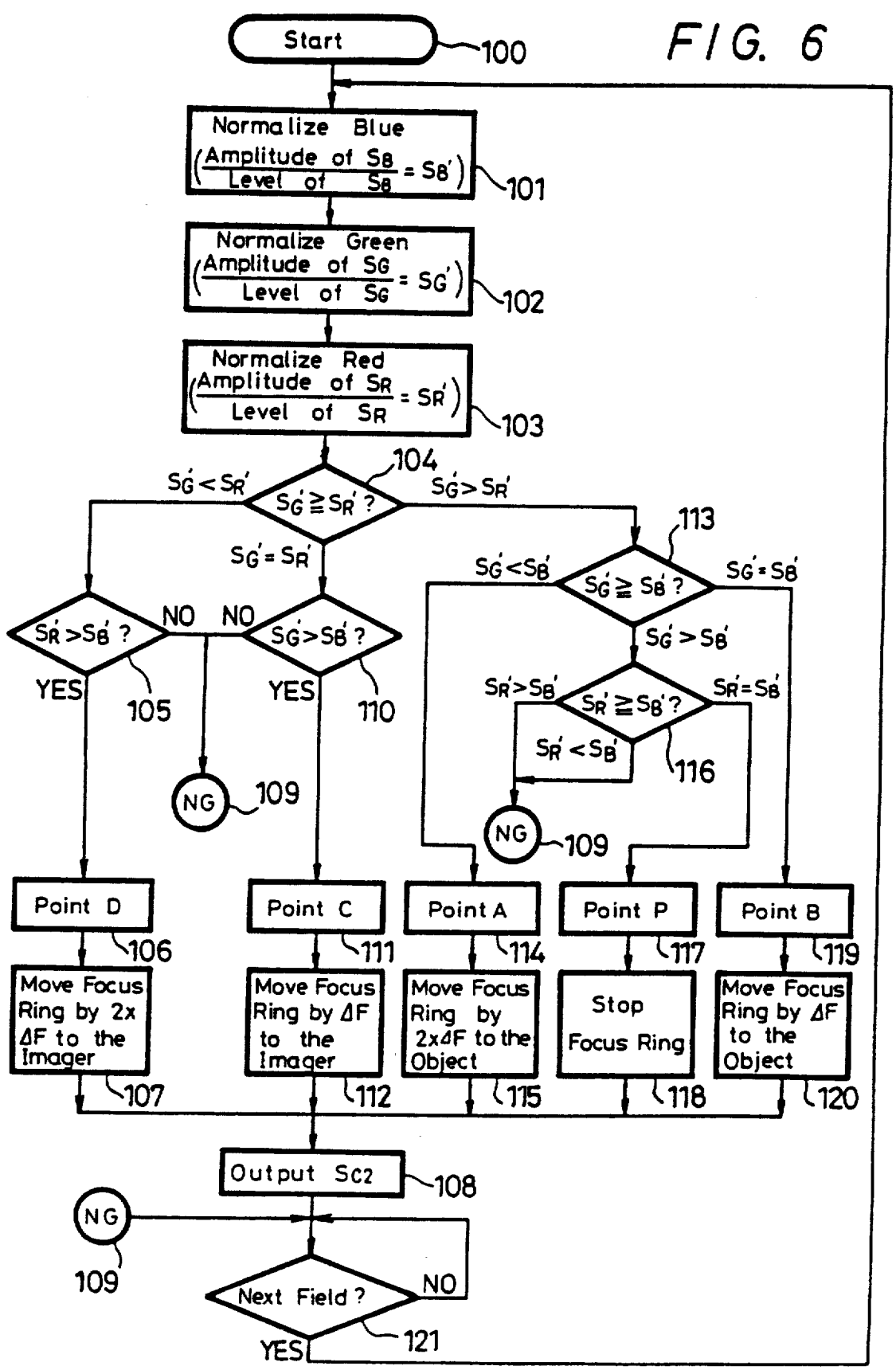
FIG. 6 is a flow chart to which reference will be made in explaining the operation of the apparatus shown in FIG. 2.

Referring to FIG. 6, when the auto-focus operation starts at step 100, the amplitude values of blue, green and red color signals $S_B$, $S_G$ and $S_R$ are respectively normalized by dividing them by the signal levels of corresponding color signals $S_B$, $S_G$ and $S_R$ at steps 101, 102 and 103. Accordingly, normalized color signals $S_B'$, $S_G'$ and $S_R'$ are obtained. Then, the values of the normalized red signal $S_R'$ and the normalized green signal $S_G'$ are compared at step 104. If the normalized red signal $S_R'$ is greater than the normalized green signal $S_G'$, then the normalized red signal $S_R'$ is compared with the normalized blue signal $S_B'$ at step 105. If the normalized red signal $S_R'$ is greater than the normalized blue signal $S_B'$, then it is determined at step 106 that the zoom lens 2 is located at about the position D according to the table of FIG. 5. Then, a control signal for moving the focus ring (not shown) of the zoom lens 2 by the amount of $2 \times \Delta F$ ($\Delta F$: minimum unit of the movement of the focus ring per one field of the color signal, for example, 1 mm/field) to the direction of the image pickup element 3 is generated at step 107, and this control signal is supplied to the focus position control circuit 15 as the control signal $S_{C2}$ at step 108.

If the normalized red signal $S_R'$ is not greater than the normalized blue signal $S_B'$ at decision step 105, it is determined that this situation does not exist according to the table of FIG. 5. Then, the routine goes to NG at step 109 and the focus ring of the zoom lens 2 is not moved.

Going back again to step 104, if the normalized green signal $S_G'$ is equal to the normalized red signal $S_R'$, then the routine goes to step 110, wherein the normalized green signal $S_G'$ and the normalized blue signal $S_B'$ are compared. If the normalized green signal $S_G'$ is greater than the normalized blue signal $S_B'$, it is determined at step 111 that the zoom lens 2 is located at about the position C according to the table of FIG. 5. Then, a control signal for moving the focus ring of the zoom lens 2 by the amount of $\Delta F$ to the direction of the image pickup element 3 is generated at step 112, and this control signal is supplied to the focus position control circuit 15 as the control signal $S_{C2}$ step 108.

If the normalized green signal $S_G'$ is not greater than the normalized blue signal $S_B'$ at decision step 110, then it is determined that this situation does not exist according to the table of FIG. 5, and the routine goes to NG at step 109.

Returning to step 104 again, if the normalized green signal $S_G'$ is greater than the normalized red signal $S_R'$, the routine goes to step 113, wherein the normalized green signal $S_G'$ and the normalized blue signal $S_B'$ are compared. If the normalized green signal $S_G'$ is smaller than the normalized blue signal $S_B'$, it is determined at step 114 that the zoom lens 2 is located at about the position A according to the table of FIG. 5. Then, a control signal for moving the focus ring of the zoom lens 2 by the amount of $2 \times \Delta F$ to the direction of the object is generated at step 115, and this control signal is supplied to the focus position control circuit 15 as the control signal $S_{C2}$ at step 108.

If the normalized green signal $S_G'$ is greater than the normalized blue signal $S_B'$ at step 113, the routine goes to step 116, wherein the normalized red signal $S_R'$ and the normalized blue signal $S_B'$ are compared. If the normalized red signal $S_R'$ is greater or smaller than the normalized blue signal $S_B'$, it is determined that this situation does not exist according to the table of FIG. 5, and the routine goes to NG at step 109. If the normalized red signal $S_R'$ is equal to the normalized blue signal $S_B'$, it is determined at step 117 that the zoom lens 2 is located at about the position P according to the table of FIG. 5. Then, a control signal for stopping the focus ring of the zoom lens 2 is generated at step 118 and this control signal is supplied to the focus position control circuit 15 as the control signal $S_{C2}$ at step 108.

Going back to step 113, if the normalized green signal $S_G'$ equals to the normalized blue signal $S_B'$, it is determined at step 119 that the zoom lens 2 is located at about the position B according to the table of FIG. 5. Then, a control signal for moving the focus ring of the zoom lens 2 by the amount of $\Delta F$ to the direction of the object is generated at step 120, and this control signal is supplied to the focus position control circuit 15 as the control signal $S_{C2}$ at step 108 signal.

Each time the control signal $S_{C2}$ is supplied to the focus position control circuit 15 at step 108, it is determined at decision step 121 whether the next field of the color signal has come by detecting vertical synchronizing signals (not shown) contained in the auto-focus control circuit 10. If so, the routine goes back to the beginning (at step 100).

While the properly-focused positions of the blue light $L_B$ and the red light $L_R$ are respectively displaced toward the zoom lens 2 side and the image pickup element 3 side from the properly-focused position P of the green light $L_G$ by the predetermined very short lengths $P_B$ and $P_R$ in the above-mentioned embodiment, in other embodiments the properly-focused positions of the blue light $L_B$ and the red light $L_R$ may be respectively moved toward the image pickup element 3 side and the zoom lens 2 side.

The apparatus of the present invention utilizes the zoom lens 2 as the lens in the afore-mentioned embodiment, but the present invention is not limited to the above-mentioned embodiment and can be applied to an apparatus that utilizes a lens with no zoom function. If so, the zoom amount detecting circuit 17 can be removed, which simplifies the overall arrangement of the apparatus.

In the above described embodiment the focus position information is detected on the basis of the amplitude values of the three signals $S_B$, $S_G$ and $S_R$ as described above, however, the present invention can be modified such that the amplitude values of, for example, two blue and red signals $S_B$ and $S_R$ are employed to detect the focus position information.

While in the above embodiment the position of the zoom lens 2 is adjusted on the basis of the amplitude values of the color signals as described above, the present invention is not limited to the above-mentioned embodiment and less advantageous embodiment can use the prior art wobbling method simultaneously.

Further, while in the above embodiment the position of the zoom lens 2 is adjusted on the basis of the focus position information as described above, the present invention is not limited to the above embodiment but can be applied to a wide variety of application fields in which the focus position information, for example, is displayed.

Furthermore, while the present invention is applied to an auto-focus apparatus for a television camera as described hereinabove, the present invention is not limited to the above-mentioned embodiment but can be applied to other apparatus such as an image pickup apparatus, a camera and so on that are used to pick up a still picture.

According to the present invention, as set forth above, since the object is picked up by using a lens with the predetermined amount of chromatic aberration and the focus position information is detected on the basis of the amplitude values of the color signals, the displaced amount from the properly-focused position can be detected without wobbling either the position of the zoom lens or the image pickup element. Therefore, it is possible to obtain an automatic focus control apparatus of a simplified arrangement that can prevent the image quality from being deteriorated.

Having described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

I claim as my invention:

1. An automatic focus control apparatus comprising:
   a) lens means having chromatic aberration;
   b) means for converting an optical signal obtained through said lens means to an electrical signal;
   c) means for processing said electrical signal to obtain a plurality of primary color signals;
   d) means for detecting the amplitude level of each of said primary color signals;

e) means for generating a control signal according to levels of said primary color signals derived from said level detecting means; and f) means for controlling the position of said lens in response to said control signal.

2. An automatic focus control apparatus according to claim 1, in which said primary color signals are red, green and blue signals.

3. An automatic focus control apparatus according to claim 1, in which said level detecting means comprises separate series circuits of a filter and a level detector provided for each of said primary color signals and first switch means for selectively supplying an output of said level detectors to said control signal generating means.

4. An automatic focus control apparatus according to claim 3, in which said control signal generating means standardizes the outputs of said level detectors by respectively dividing said outputs by the amplitude levels of the corresponding primary color signals output by said processing means.

5. An automatic focus control apparatus according to claim 4, further comprising second switch means for selectively supplying said primary color signals to said control signal generating means.

6. An automatic focus control apparatus according to claim 5, further comprising analog-to-digital converter means for separately converting the outputs of said level detectors and the output of said second switch means.

7. An automatic focus control apparatus according to claim 6, in which said control signal generating means includes stored information representing level orders of said primary color signals versus each focus point of said primary colors, and wherein said control signal is generated according to said stored information.

8. An automatic focus control apparatus according to claim 1, in which said lens means is a zoom lens and said apparatus further comprises means for detecting the zoom amount of said zoom lens, the output of said zoom amount detecting means being supplied to said control signal generating means for compensation of said control signal.

9. An automatic focus control apparatus according to claim 2, further comprising a matrix circuit for converting said red, green and blue primary color signals to a luminance signal and color difference signals.

* * * * *